United States Patent [19]

Mahabadi et al.

[11] Patent Number: 5,236,629
[45] Date of Patent: * Aug. 17, 1993

[54] CONDUCTIVE COMPOSITE PARTICLES AND PROCESSES FOR THE PREPARATION THEREOF

[75] Inventors: Hadi K. Mahabadi, Toronto; Denise Y. Wright; T. Hwee Ng, both of Mississauga, all of Canada; Angelo J. Barbetta, Penfield; John A. Creatura, Ontario, both of N.Y.

[73] Assignee: Xerox Corporation, Stamford, Conn.

[ * ] Notice: The portion of the term of this patent subsequent to Nov. 17, 2009 has been disclaimed.

[21] Appl. No.: 792,570

[22] Filed: Nov. 15, 1991

[51] Int. Cl.$^5$ .......................... G03G 5/00; H01B 1/04; H01B 1/06; H01B 1/02

[52] U.S. Cl. .................... 252/511; 430/137; 252/502; 252/512; 252/518; 252/513; 252/514

[58] Field of Search ............... 252/511, 502, 512, 518, 252/513, 514; 430/137

[56] References Cited

U.S. PATENT DOCUMENTS

| | | | |
|---|---|---|---|
| 4,055,684 | 10/1977 | Baltazzi et al. | 427/18 |
| 4,363,863 | 12/1982 | Veillette et al. | 430/115 |
| 4,415,644 | 11/1983 | Tamaki et al. | 430/106.6 |
| 4,514,485 | 4/1985 | Ushiyama et al. | 430/106.6 |
| 4,876,169 | 10/1989 | Gruber et al. | 430/110 |
| 4,897,332 | 1/1990 | Gibson et al. | 430/115 |
| 4,923,776 | 5/1990 | Hedvall et al. | 430/111 |
| 5,015,550 | 5/1991 | Creatura et al. | 430/108 |
| 5,043,404 | 8/1991 | Mahabadi et al. | 526/194 |
| 5,104,767 | 4/1992 | Nakamura | 430/138 |

FOREIGN PATENT DOCUMENTS 2099000 12/1982 United Kingdom.

Primary Examiner—Paul Lieberman
Assistant Examiner—Michael Tierney
Attorney, Agent, or Firm—E. O. Palazzo

[57] ABSTRACT

A process for the preparation of conductive submicron polymeric particles which comprises mixing at least one monomer with a polymerization initiator, a crosslinking component and a chain transfer component; effecting bulk polymerization until from about 10 to about 50 weight percent of the monomer has been polymerized; terminating polymerization by cooling the partially polymerized monomer; adding thereto from about 1 to about 50 weight percent of a conductive filler, or conductive fillers, followed by mixing thereof; dispersing the aforementioned mixture of conductive filler or fillers, and partially polymerized product in water containing a stabilizing component to obtain a suspension of particles with an average diameter of from about 0.05 to about 1 micron in water; polymerizing the resulting suspension by heating; and subsequently washing and drying the product.

31 Claims, No Drawings

CONDUCTIVE COMPOSITE PARTICLES AND PROCESSES FOR THE PREPARATION THEREOF

BACKGROUND OF THE INVENTION

This invention is generally directed to submicron conductive composite particles and processes for the preparation thereof, and more specifically the present invention relates to submicron conductive polymeric composite particles, each comprising a polymer and a conductive filler distributed evenly throughout the polymer matrix of composite. The present invention also relates to processes for the preparation of polymeric composite particles. In one embodiment, the process of the present invention comprises the preparation of conductive submicron polymeric particles containing a conductive filler distributed substantially throughout the polymer matrix of the particles, and which particles can be selected as carrier powder coatings. In another embodiment, the process of the present invention comprises the preparation of conductive polymeric composite particles with an average particle size diameter of from between about 0.05 micron to about 1 micron. The conductivity of the generated submicron polymeric composite particles can be modified by, for example, varying the weight percent of conductive filler component present in effective amounts of, for example, from between about 1 weight percent to about 50 weight percent, and also by varying the composition of the conductive filler component. Thus, conductive submicron polymeric composite particles with a conductivity of from between about $10^{-10}(\text{ohm-cm})^{-1}$ to about $10^{-4}(\text{ohm-cm})^{-1}$ can be prepared. In one process embodiment, the particles with average diameter of about 0.05 to about 1 micron conductive composite particles are comprised of polymer and a conductive filler distributed evenly throughout the polymer matrix of the composite product, and which product can be obtained by a semisuspension polymerization method as illustrated in U.S. Pat. No. 5,043,404, the disclosure of which is totally incorporated herein by reference. In the aforementioned semisuspension polymerization processes, a mixture of monomer or comonomers, a polymerization initiator, a crosslinking component and a chain transfer component are bulk polymerized until partial polymerization is accomplished, for example. In one specific embodiment of the present invention, from about 10 to about 50 percent of monomer or comonomers are converted to polymer, thereafter the resulting partially polymerized monomer, or comonomers, is cooled to cease bulk polymerization and to the cooled mixture of polymerized monomer, or comonomers, is added a conductive filler, followed by mixing, using, for example, a high shear mixer until a homogeneous mixer, or organic phase is obtained. Subsequently, the resulting organic phase is dispersed in water containing a stabilizing component with, for example, a high shear mixer, then the resulting suspension is transferred to a reactor and completely polymerized, the content of polymerization reactor is then cooled, followed preferably by washing and drying the polymer product.

Metals such as carrier cores are conductive or semiconductive materials, and the polymeric materials used to coat the surface of metals are usually insulating. Therefore, carrier particles coated completely with polymer or a mixture of polymers can lose their conductivity and become insulating. Although this is desired for some applications, for conductive magnetic brush systems (CMB) the carrier particles should be conductive. Since the carrier polymer coating can be utilized to control carrier tribo, a conductive carrier coating is needed to design carriers with the desired conductivity and triboelectrical properties. Conductive polymers are very costly, and are not suitable for preparing low cost, for example less than $5/pound, coating, thus a conductive polymer composite comprising a low cost polymer and a conductive filler such as conductive carbon black is considered a more suitable alternative.

A polymer composite coating of metal materials, such as carrier beads, is known and can be obtained by two general approaches, solution and powder coating. Solution coating of carriers using a polymer composite solution comprised of a polymer, a conductive filler and solvent can be utilized to prepare conductive carrier, however, trapping of solvent in the solution coating adversely interferes with the use of coated materials, for example the residual solvent trapped in the carrier coating reduces the carrier life, and the release of solvent in the developer housing can cause other problems related to harmful effects of absorbed solvent to various copying machine parts and toxicity of solvent. Moreover, the solvent recovery operation involved in the solution coating processes is costly. The powder coating of metal surfaces can eliminate the need for solvent, and therefore, many of the problems associated with solution coating; however, it requires polymer powder with very small size, for example less than one micron. Although several polymer powders with desired particle size are available for carrier powder coating, submicron polymer composite particles containing conductive filler to prepare conductive coated carriers that maintain their triboelectrical characteristics for extended time periods exceeding, for example, 200,000 images are not known, or available. Therefore, there is a need for conductive submicron polymeric composite particles each containing a conductive filler distributed evenly throughout particles and a process for preparing them.

The preparation of polymeric particles for powder coatings can be accomplished by three methods, namely grinding or attrition, precipitation and in situ particle polymerization. Grinding or attrition, especially fluid energy milling, of large polymeric particles or polymeric composite particles containing fillers to the size needed for powder coating, for example less than one micron, is often not desirable both from an economic and functional viewpoint. These materials are difficult to grind, and therefore, grinding or attrition of required materials for coating with present milling equipment is very costly due to very low processing yield, for example in the range of 5 to 10 weight percent. Precipitation process can also be used to prepare polymeric/polymeric composite particles. In one approach, the polymer solution is heated to above its melting temperature and then cooled to form particles. In another process, the polymer solution is precipitated using a nonsolvent or the polymer solution is spray dried to obtain polymeric/polymeric composite particles. With all these precipitation processes, it has been difficult to achieve low cost, clean (that is, for example, with no or substantially no impurities such as solvents or precipitants in the resulting polymer) particles. It is also difficult to obtain particles with small particle size and narrow particle size distribution. It is also difficult to control filler distribution throughout each particle's polymer matrix. In the in situ particle polymerization process, polymer particles are prepared by using suspension dispersion, emulsion and semisuspension polymerization. Suspension polymerization can be utilized to prepare polymer particles and polymeric composite particles containing, for example, a conductive filler. However, this process does not, for example, enable particles with size less than five microns. Although emulsion and dispersion polymerization can be utilized to prepare polymeric particles of small size, for example less than one micron, these processes wherein particle formation is achieved by nucleation and growth do not enable synthesis of particles containing fillers such as conductive fillers. Conductive fillers, such as carbon blacks, are free radical polymerization inhibitors stopping or at least reducing the rate of polymerization. Moreover, inclusion of fillers to obtain particles with evenly distributed fillers is not believed achievable with the prior art processes mentioned herein. The semisuspension polymerization process is used to prepare submicron polymeric particles each containing conductive fillers which are evenly distributed throughout the polymer matrix.

There is disclosed in U.S. Pat. No. 4,908,665 a developing roller or developer carrier comprised of a core shaft, a rubber layer and a resin coating layer on the surface of the rubber containing conductive fillers for a one component developer. It is indicated in the '665 patent that conductive developing roller can eliminate variation of the image characteristic due to the absorption of moisture for one component development. However, this patent describes a developing roller for one component developer and does not teach the preparation of conductive carrier beads for dry two component developer. U.S. Pat. No. 4,590,141 discloses carrier particles for two component developer coated with a layer of silicon polymer using fluidized bed solution coating. U.S. Pat. No. 4,562,136 discloses as a two component dry type developer which comprises carrier particles coated with a silicon resin containing a monoazo metal complex charging. The two component carriers described in the above two patents are insulating and are not believed to be conductive. There is disclosed in U.S. Pat. No. 4,912,005 a conductive carrier composition coated with a layer of resin containing a conductive particle by solution coating. Residual solvent trapped in the coated layer adversely effects the maintainability of carrier electrical properties for an extended time period.

There is disclosed in U.S. Pat. No. 3,505,434 a process wherein particles for fluidized bed powder coating are prepared by dispersing the polymer in a liquid which is heated to above the polymer melting point and stirred causing the polymer particles to form. The particles are then cooled below their melting point and recovered. However, this process does not, for example, enable particles with a size of below 50 microns.

Also, the suspension polymerization of monomer is known for the formation of polymer/polymeric composite particles generally in a size range of about 200 microns and higher. The main advantage of suspension polymerization is that the product may easily be recovered, therefore, such a process is considered economical. However, it is very difficult by suspension polymerization to prepare very small particles as the monomer droplets tend to coalesce during the polymerization process, especially in the initial stage of polymerization where the droplets are very sticky. For example, there is disclosed in U.S. Pat. No. 3,243,419 a method of suspension polymerization wherein a suspending agent is generated during the suspension polymerization to aid in the coalescence of the particles. Also disclosed in U.S. Pat. No. 4,071,670 is a method of suspension polymerization wherein the monomer initiator mixture is dispersed in water containing stabilizer by a high shear homogenizer, followed by polymerization of suspended monomer droplets.

Further, disclosed in U.S. Pat. No. 4,835,084 is a method for preparing pigmented particles wherein high concentration of silica powder is used in the aqueous phase to prevent coalescence of the particles. There is also disclosed in U.S. Pat. No. 4,833,060 a process for the preparation of pigmented particles by dissolving polymer in monomer and dispersing in the aqueous phase containing silica powder to prevent coalescence of the particles. However, the silica powder used in both U.S. Patents '084 and '060 should be removed using KOH which is costly, and residual KOH and silica materials left on the surface affects the charging properties of particles. Moreover, the above process does not teach preparation of submicron conductive particles. There is also disclosed in U.S. Pat. No. 3,954,898 a two step polymerization process for the preparation of a thermositting finished powder. However, this process does not enable synthesis of particles with size less than 100 microns. Moreover, this patent does not teach the synthesis of submicron particles containing conductive fillers.

As a result of a patentability search in the aforementioned U.S. Pat. No. 5,043,404, there were located U.S. Pat. No. 4,486,559, which discloses the incorporation of a prepolymer into a monomer toner mix followed by emulsion polymerization; and U.S. Pat. Nos. 4,680,200 and 4,702,988, which illustrate emulsion polymerization. It is known that submicron polymeric particles can be synthesized by emulsion polymerization. However, synthesis of submicron polymeric particles by emulsion polymerization requires a high concentration of emulsifier which remains in the final product and renders it humidity sensitive. Therefore, emulsion polymerization does not enable preparation of clean submicron polymeric particles which are not sensitive to humidity. Moreover, in the emulsion polymerization particle formation is controlled by diffusion of monomer from monomer droplet through a water phase into the growing particles. This mechanism, which is characteristic of emulsion polymerization, does not allow inclusion of conductive fillers in the polymeric particles. Furthermore, it is known that the addition of conductive fillers into emulsion, dispersion or suspension polymerization systems cause severe inhibition which stops or reduces the rate of polymerization significantly.

Disclosed in the aforementioned U.S. Pat. No. 5,043,404, the disclosure of which is totally incorporated herein by reference, is a semisuspension polymerization process for the preparation of small polymeric particles which are comprised of a mixture of monomer or comonomers, a polymerization initiator, a crosslinking component and a chain transfer component which are bulk polymerized until partial polymerization is accomplished. The resulting partially polymerized monomer or comonomers is dispersed in water containing a stabilizer component with, for example, a high shear mixer, then the resulting suspension polymerized, followed by washing and drying the submicron polymeric particles. However, U.S. Pat. No. 5,043,404 does not disclose submicron conductive polymeric particles containing conductive fillers.

There thus remains a need for a submicron conductive polymeric particles, and more specifically conductive submicron polymeric particles containing conductive fillers distributed throughout each particle. Further, there is a need for a process to obtain conductive submicron polymer particles, each containing conductive fillers evenly distributed in the polymer, and more specifically, there is a need for a semisuspension polymerization process for obtaining low cost clean and dry small, for example from between about 0.05 to about 1 micron in average diameter as determined by a scanning electron microscope, polymeric particles containing from about 1 to about 50 weight percent of a conductive filler such as carbon black which is evenly distributed throughout the polymer matrix. Further, there is a need for semisuspension polymerization processes that permit low cost, clean, and dry submicron conductive polymeric particles that can be selected as carrier powder coatings.

SUMMARY OF THE INVENTION

It is, therefore, an object of this invention to provide conductive submicron polymeric composite particles and processes thereof with many of the advantages illustrated herein.

In another object of the present invention there are provided conductive submicron polymeric composites comprised of a polymer and a conductive filler distributed evenly throughout the polymer matrix of the composite and process for the preparation thereof.

In yet another object of the present invention there are provided low cost, clean and dry conductive submicron polymeric composite particles comprised of from about 50 to about 99 weight percent of polymer and from about 1 to about 50 weight percent of conductive filler distributed throughout the polymer matrix of composite as measured by TEM, and processes for the preparation thereof.

Another object of the present invention resides in conductive submicron polymeric composite particles with a conductivity from about $10^{-10}$ (ohm-cm)$^{-1}$ to about $10^{-4}$ (ohm-cm)$^{-1}$ and processes for the preparation thereof.

Another object of the present invention resides in conductive submicron polymeric composite particles with an average particle diameter size of from about 0.05 micron to about 1 micron.

In another object of the present invention there are provided conductive submicron polymeric composites which can be selected for two component carrier powder coatings and processes for preparing such particles.

In another object of the present invention there are provided simple processes for the formation of small conductive polymeric particles, and more specifically submicron size conductive polymeric particles.

Also, in another object of the present invention there are provided simple and economical processes for the formation of conductive submicron polymeric particles that can be selected as carrier coatings. reference U.S. Pat. Nos. 4,937,166 and 4,935,326, the disclosures of which are totally incorporated herein by reference.

Another object of the present invention resides in simple and economical semisuspension polymerization processes for the preparation of low cost, clean, and dry submicron conductive polymeric particles, and more specifically submicron size conductive polymeric particles useful as carrier powder coatings.

Additionally, in another object of the present invention there are provided as a result of the enhanced degree of control and flexibility processes for the preparation of polymeric particles containing a conductive filler, or fillers with improved flow and fusing properties; and particles that can be selected for conductive carrier powder coating with a triboelectric charge in the range, for example, of from about $-40$ to about $+40$ microcoulombs per gram as determined by the known Faraday Cage process.

These and other objects of the present invention can be accomplished in embodiments by the provision of processes for the preparation of submicron conductive polymer particles, each containing conductive filler or fillers, distributed evenly throughout the polymer matrix of particles, referred to herein as semisuspension polymerization processes in which a mixture of monomer or comonomers, a polymerization initiator, an optional crosslinking component and an optional chain transfer component is bulk polymerized until partial polymerization is accomplished, for example from about 10 to about 50 percent of monomer or comonomers is converted to polymer. The bulk polymerization is then stopped by cooling the partially polymerized monomer or comonomers. To the cooled partially polymerized product there is then added a conductive filler, followed by mixing thereof with, for example, a high shear homogenizer, such as a Brinkman homogenizer to prepare a mixture, or organic phase. The viscosity of the organic phase can in embodiments be an important factor in controlling dispersion of the conductive filler in the particles, and which viscosity can be adjusted by the percentage of polymer in the mixture. The aforementioned partially polymerized product with filler is then dispersed in water containing a stabilizing component with, for example, a high shear mixer to permit the formation of a suspension containing small, less than 10 microns for example, particles therein, and thereafter, transferring the resulting suspension product to a reactor, followed by polymerization until complete conversion to the polymer product is achieved. The polymer product can then be cooled, washed and dried. More specifically, the process of the present invention is comprised of (1) mixing a monomer or comonomers with polymerization initiators, a crosslinking component and a chain transfer component; (2) effecting bulk polymerization by increasing the temperature of the aforementioned mixture to from about 45° C. to about 120° C. until from about 10 to about 50 weight percent of monomer or comonomers has been polymerized; the molecular weight of polymer in the bulk or the percentage of polymer present in the mixture which affects the viscosity of the partially polymerized monomer or comonomers is an important factor in controlling conductive filler distribution in the particles; (3) cooling the partially polymerized monomer or comonomers and adding a conductive filler, followed by mixing thereof with, for example, a high shear homogenizer to form an organic phase; (4) dispersing the organic phase in from about 2 to about 5 times its volume of water containing from about 1 to about 5 weight percent of a stabilizing component to form a suspension with a particle size diameter of from about 0.05 micron to about 1 micron particles containing from about 1 to about 50 weight percent of a conductive filler, or conductive fillers using a high shear mixer; (5) transferring the resulting suspension to a reactor and polymerizing the suspension by increasing its temperature to from about 45° C. to about 120° C. to allow the complete conversion of monomer or comonomers to polymer; (6) cooling the product and washing the product with water and/or an alcohol like methanol; (7) separating polymer particles from the water/methanol by means of filtration or centrifugation; and (8) drying the polymeric particles.

One specific embodiment of the present invention comprises the preparation of polymeric particles, which comprises mixing at least one monomer with a polymerization initiator, a crosslinking component and a chain transfer component; effecting bulk polymerization until from about 10 to about 50 weight percent of the monomer has been polymerized; adding a conductive filler thereto and mixing; dispersing the aforementioned product in water containing a stabilizing component to obtain a suspension of particles with an average diameter of from about 0.05 to about 1 micron in water; and polymerizing the resulting suspension. By at least one monomer is intended to include from about 2 to about 20 monomers, comonomers thereof, and the like. Throughout "from about to about" includes between the ranges provided.

The present invention is directed to the preparation of small conductive polymeric particles, that is with, for example, an average particle diameter in the range of from about 0.05 micron to about 1 micron, and preferably from about 0.1 to about 0.8 micron as measured by SEM containing 1 to about 50 percent and preferably 10 to 20 percent conductive filler distributed throughout the polymer matrix of particles, and which particles have a number and weight average molecular weight of from between about 5,000 to about 500,000 and from between about 10,000 to about 2,000,000, respectively, in embodiments.

Further, the process of the present invention is directed to the preparation of conductive polymeric particles of average diameter of from about 0.1 micron to about 0.8 micron containing 10 to 20 weight percent of a conductive filter and 80 to 90 weight percent of a polymeric material. This polymeric material can be comprised of two linear and crosslinked portions with a number average molecular weight of the linear portion being from about 5,000 to about 50,000 and a weight average molecular weight of from about 100,000 to about 500,000 and from 0.1 to about 5 weight percent of a crosslinked portion, and which polymer product is useful for carrier coatings. More specifically, the process of the present invention in this embodiment is directed to the preparation of conductive polymeric particles of an average diameter in the range of between about 0.1 to about 0.8 micron, conductive filler distributed evenly throughout polymer matrix of particle as measured by TEM with a linear portion having a number average molecular weight in the range of from about 5,000 to about 50,000, and a weight average molecular weight of from about 100,000 to about 500,000 and from about 0.1 to about 5 weight percent of a crosslinked portion. This process is as indicated herein and specifically comprises (1) mixing a monomer or comonomers with a polymerization initiator with the ratio of monomer or comonomers to initiator being from about 100/2 to about 100/20, a crosslinking component with the ratio of monomers or comonomers to crosslinking component being from 100/0.1 to about 100/5, and a chain transfer component with the ratio of monomer or comonomers to the chain transfer component being from about 100/0.01 to about 100/1; (2) effecting bulk polymerization by increasing the temperature of the mixture to from about 45° C. to about 120° C. until from about 10 to about 50 weight percent of monomer or comonomers has been converted to polymer with a number average molecular weight of from 5,000 to about 50,000 and a weight average molecular weight of from about 10,000 to about 40,000, and thereafter, adding conductive filler thereto with the ratio of filler to polymer monomer mixture being from about 0.1 to about 0.2, followed by extensive mixing to prepare organic phase; (3) dispersing the resulting organic phase from about 2 to about 5 times its volume in water containing from about 1 to about 5 weight percent of a stabilizing component, preferably polyvinylalcohol having a weight average molecular weight of from 1,000 to about 10,000 to form a suspension containing particles with a particle size diameter of from 0.1 to about 0.8 micron by using high shear mixer; (4) transferring the resulting suspension to a reactor and polymerizing the suspension by increasing its temperature to from about 45° C. to about 120° C. to allow the complete conversion of monomer or comonomers to polymer; (5) washing the resulting the product with equal volumes of methanol and/or water from about 3 to about 5 times; (6) separating polymeric particles from water/methanol by means of filtration or centrifugation; and (7) drying of the polymeric particles.

In an embodiment, the present invention is directed to a process for the preparation of conductive submicron polymeric particles which comprises mixing at least one monomer with a polymerization initiator, a crosslinking component and a chain transfer component; effecting bulk polymerization until from about 10 to about 50 weight percent of the monomer has been polymerized; terminating polymerization by cooling the partially polymerized monomer; adding thereto from about 1 to about 50 weight percent of a conductive filler, or conductive fillers, followed by mixing thereof; dispersing the aforementioned mixture of conductive filler or fillers, and partially polymerized product in water containing a stabilizing component to obtain a suspension of particles with an average diameter of from about 0.05 to about 1 micron in water; polymerizing the resulting suspension by heating; and subsequently washing and drying the product.

Illustrative examples of monomer or comonomers present in an amount of, for example, from about 80 to about 99 weight percent include vinyl monomers comprised of styrene and its derivatives such as styrene, α-methylstyrene, p-chlorostyrene and the like; monocarboxylic acids and their derivatives such as acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; dicarboxylic acids having a double bond and their derivatives such as maleic acid, monobutyl maleate, dibutylmaleate; vinyl esters such as vinyl chloride, vinyl acetate and vinyl benzoate; vinyl ketones such as vinyl methyl ketone and vinyl ether ketone; and vinyl ethyl ether and vinyl isobutyl ether; vinyl naphthalene; unsaturated mono-olefins such as isobutylene and the like; vinylidene halides such as vinylidene chloride and the like; N-vinyl compounds such as N-vinyl pyrrole and fluorinated monomers such as pentafluoro styrene, allyl pentafluorobenzene and the like; and mixture thereof.

Illustrative examples of polymerization initiators present in an amount of, for example, from about 0.1 to about 20 weight percent of monomer include azo compounds such as 2,2′azodimethylvaleronitrile, 2,2′azoisobutyronitrile, azobiscyclohexanenitrile, 2-methylbutronitrile and the like, and peroxide such as benzoyl peroxide, lauryl peroxide, 1-1-(t-butylperoxy)-3,3,5-trimethylcyclohexane, n-butyl-4,4-di-(t-butylperoxy)valerate, dicumyl peroxide and the like.

Crosslinkers selected for the process of the present invention are known and can be comprised of compounds having two or more polymerizable double bonds. Examples of such compounds include aromatic divinyl compounds such as divinylbenzene and divinylnaphthalene; carboxylic acid esters having two double bounds such as ethylene glycol diacrylate, ethylene glycol dimethylacrylate and the like; divinyl compounds such as divinyl ether, divinyl sulfite, divinyl sulfone and the like. Among these divinylbenzene is particularly useful. The crosslinking component is preferably present in an amount of from about 0.1 to about 5 parts by weight in 100 parts by weight of monomer or comonomers mixture.

Examples of conductive fillers present in effective amounts as illustrated herein, for example, include conductive carbon blacks such as acetylene black, available from Chevron Chemical, VULCAN BLACK ™, BLACK PEARL L®, KEYTJEN BLACK EC600JD®, available from AK20, CONDUCTEX SC ULTRA ™, available from Columbian Chemical, metal oxides such as iron oxides, TiO, $SnO_2$ and metal powders such as iron powder.

Stabilizers present in an amount of, for example, from about 0.1 to about 5 weight percent of water are selected from the group consisting of both nonionic and ionic water soluble polymeric stabilizers such as methyl cellulose, ethyl cellulose, hydroxypropyl cellulose, block copolymer such as PLURONIC E87 ™ from BASF, sodium salt of carboxyl methyl cellulose, polyacrylate acids and their salts, polyvinyl alcohol, gelatins, starches, gums, alginates, zein and casein and the like; and barrier stabilizers such as tricalcium phosphate, talc, barium sulfate and the like. Among these, polyvinyl alcohol with a weight average molecular weight of from about 1,000 to about 10,000 is particularly useful.

Chain transfer components selected which primarily function to control molecular weight by inhibiting chain growth include mercaptans such as laurylmercaptan, butylmercaptan and the like, or halogenated carbons such as carbon tetrachloride or carbon tetrabromide, and the like. The chain transfer agent is preferably present in an amount of from about 0.01 to about 1 weight percent of monomer or comonomer mixture. Also, stabilizer present on the surface of the polymeric particles can be washed using an alcohol such as, for example, methanol and the like, or water. Separation of washed particles from solution can be achieved by any classical separation technique such as filtration, centrifugation and the like. Classical drying techniques such as vacuum drying, freeze drying, spray drying, fluid bed drying and the like can be selected for drying of the polymeric particles.

Illustrative specific examples of polymer or copolymers present in an amount of about 50 to about 99 weight percent containing, for example, both a linear and a crosslinked portion in which the ratio of crosslinked portion to linear portion is from about 0.001 to about 0.05 and the number and weight average molecular weight of the linear portion is from about 5000 to about 500,000 and from about 10,000 to about 2,000,000, respectively, include vinyl polymers of polystyrene and its copolymers, polymethylmethacrylate and its copolymers, unsaturated polymers or copolymers such as styrene-butadiene copolymers, fluorinated polymers or copolymers such as poly pentafluorostyrene polyallylpentafluorobenzene and the like.

The particles of the present invention can be selected as carrier powder coatings, which carriers contain, for example, a steel core, and can be admixed with toner compositions comprised of resin particles, pigment particles and optional additives such as charge control components, reference U.S. Pat. No. 4,560,635, the disclosure of which is totally incorporated herein by reference, enabling the formation of a developer composition useful in electrophotographic imaging processes.

The following Examples are being submitted to further define various species of the present invention. These Examples are intended to be illustrative only and are not intended to limit the scope of the present invention. Also, parts and percentages are by weight unless otherwise indicated.

EXAMPLE I

To 120 grams of methylmethacrylate monomer were added 10 grams of 2,2′-azobis(2,4-dimethylvaleronitrile), 1.6 grams of benzoyl peroxide and 0.6 gram of divinyl benzene crosslinking agent, which are mixed in a one liter flask using a mechanical stirrer until dissolved. This mixture was bulk polymerized by heating in a one liter glass reactor to 60° C., by means of an oil bath kept at 62° C., while the mixture in the reactor was stirred with a TEFLON ™ propeller until 15 weight percent of the monomer as measured by gas chromatography is converted to polymer. The reactor was then removed from the oil bath and cooled to near 0° C. by means of an ice bath. To this cooled mixture was then added 4.4 grams of acetylene black carbon black obtained from Chevron Shawingigan Company and the contents were mixed using a Brinkmann PT456G polytron homogenizer at 10,000 revolutions per minute for 3 minutes to obtain an organic phase homogeneous mixture. This organic phase was then poured, along with 440 milliliters of water containing 4 weight percent of polyvinyl alcohol having a weight average molecular weight of 3,000, into a two liter stainless steel beaker. The beaker was then placed in an ice bath and using a Brinkmann PT456G polytron homogenizer the resulting mixture was then vigorously stirred at 10,000 revolutions per minute for 5 minutes to produce a microsuspension of polymeric particles containing carbon black in water. A quantity of 0.4 gram of potassium iodide was then added as an aqueous phase inhibitor. The resulting microsuspension was transferred to a 1 liter stainless steel reactor with an aluminum block heater and cold water coil cooling. The suspension polymerization temperature was raised from 25° to 60° C. in 35 minutes where it was held for 2 hours, then the temperature was increased to 85° C. in 120 minutes and held there for 1 hour, after which the suspension was cooled in 30 minutes to 25° C. When cooled to 25° C. the suspension polymerization was complete as measured using gas chromatography and was filtered using one micron filter to remove coarse fouled material with a particle size of over 10 microns. The microsuspension product was then poured into 1 liter of methanol. The resulting diluted suspension was centrifuged in 3 minutes at 3,000 RPM in two 1 liter bottles. The resulting supernatant liquid comprised of the diluted polyvinyl alcohol was decanted, fresh methanol/water 50:50 ratio was added and the mixture was polytroned for 1 to 2 minutes at 5,000 revolutions per minute. This washing procedure was again repeated with deionized water. After the final wash, the product was freeze dried to provide dry individual particles. Using a scanning electron microscope (SEM), photomicrographs of the dry product are taken and indicate that the average particle size of the polymer product was 0.4 micron with a glass transition temperature of 115° C. as measured by DSC. The product conductivity is measured by melting one gram of product in the form of film, and using a conductivity meter, the results showed a conductivity of $10^{-10}$ (ohm-cm)$^{-1}$. The 0.7 gram of the resulting polymethyl methacrylate particles containing carbon black were mixed with 100 grams of Toniolo core carrier with an average bead diameter of 120 microns in a Munson type mixer at room temperature. The coated materials were then fused on the surface of the carrier at 300° F. in a rotary kiln furnace. The product was sieved through a 177 micron screen to remove coarse materials. The coarse fraction was found to be about 0.1 weight percent. The sieved materials were scanned for surface coverage using the SEM. The results evidenced 100 percent surface coverage of polymer. The functional evaluation of the resulting carrier in the Xerox Corporation 5100 two component development system had a triboelectric charge (tribo) of 28 microcoulombs per gram ($\mu$c/g) as determined by the Faraday Cage method, and a conductivity of $10^{-10}$ (ohm-cm)$^{-1}$.

EXAMPLE II

The process of Example I was repeated except the bulk polymerization conversion of monomer to polymer is 20 and 5.2 grams of acetylene black were used. The resulting product has an average particle size of 0.6 micron with a conductivity of $10^{-8}$ (ohm-cm)$^{-1}$ and glass transition temperature of 116° C. The same carrier coating as described in Example I was used resulting in a 0.6 weight percent coarse fraction. The coated carrier had a tribo of 26.2 microcoulombs per gram and a conductivity of $3.1 \times 10^{-8}$ (ohm-cm)$^{-1}$.

EXAMPLE III

The process of Example I was repeated except that 9 grams of acetylene black were used. The resulting polymeric product had an average particle size of 0.7 micron and a glass transition temperature of 115° C. The same carrier coating as described in Example I was used resulting in a coarse fraction of 0.55 weight percent. The coated carrier had a tribo charge of 24.6 microcoulombs per gram and a conductivity of $2 \times 10^{-6}$ (ohm-cm)$^{-1}$.

EXAMPLE IV

The process of Example I was repeated except 11 grams of acetylene black was used. The resulting polymeric product has an average particle size of 0.8 micron with glass transition temperature of 114° C. The same carrier coating process as described in Example I was used resulting in a coarse fraction of 0.2 weight percent. The coated carrier had a tribo charge of 24.6 microcoulombs per gram and a conductivity of $1.2 \times 10^{-5}$ (ohm-cm)$^{-1}$.

EXAMPLE V

The process of Example I was repeated except the bulk polymerization conversion of monomer to polymer was 20 weight percent and 10 grams of acetylene black were used. The resulting polymeric product has an average particle size of 0.9 micron with a glass transition temperature of 115° C. The same carrier coating process as described in Example I was used resulting in a 0.3 weight percent coarse fraction. The coated carrier showed a tribo of 24 microcoulombs per gram and a conductivity of $4.5 \times 10^{-5}$ (ohm-cm)$^{-1}$.

EXAMPLES VI to X

The process of Examples I to V were repeated except CONDUCTEX SC ULTRA CARBON BLACK TM obtained from Columbian Chemicals was used. Conductive submicron polymers and coated carriers with similar properties of Examples I to V were obtained.

EXAMPLE XI

The process of Example I was repeated except a mixture of styrene and methylmethacrylate with 20 weight percent of styrene and 90 weight percent of methylmethacrylate comonomer was used in place of the monomers of Example I. The resulting submicron polymeric particles and coated carrier with properties similar to that of Example I, and wherein the tribo charge of coated carrier was 18 microcoulombs per gram.

EXAMPLE XII

The process of Example IV was repeated except styrene monomer was used. Submicron conductive particles and coated carrier with the same properties of Example IV except with a tribo charge of 5 microcoulombs per gram were obtained.

EXAMPLE XIII

The process of Example IV was repeated except a mixture of 20 weight percent of acrylic acid and 80 weight percent of styrene comonomer was used. The resulting submicron conductive particles and coated carrier with the same properties as that of Example IV except with a tribo charge of $-10$ microcoulombs per gram were obtained.

EXAMPLE XIV

The process of Example IV was repeated except pentafluorostyrene monomer was used. The resulting submicron conductive particles and coated carrier with the same properties as that of Example IV except with a tribo charge of $-25$ microcoulombs per gram were obtained.

EXAMPLE XV

The process of Example IV was repeated except allyl pentafluorobenzene monomer was used in place of methylmethacrylate monomer. The resulting submicron conductive particles and the coated carrier with the same properties as that of Example IV except with a tribo charge of $-35$ microcoulombs per gram were obtained.

Other modifications of the present invention may occur to those skilled in the art subsequent to a review of the present application. The aforementioned modifications, including equivalents thereof, are intended to be included within the scope of the present invention.

What is claimed is:

1. A process for the preparation of conductive submicron polymeric particles consisting essentially of mixing at least one monomer with a polymerization initiator, a crosslinking component and a chain transfer component; effecting bulk polymerization until from about 10 to about 50 weight percent of the monomer has been polymerized; terminating polymerization by cooling the partially polymerized monomer; adding thereto from about 1 to about 50 weight percent of a conductive filler, or conductive fillers, followed by mixing thereof; dispersing the aforementioned mixture of conductive filler or fillers, and partially polymerized product in water containing a stabilizing component selected from the group consisting of nonionic and ionic water soluble polymeric stabilizers to obtain a suspension of particles with an average diameter of from about 0.05 to about 1 micron in water; polymerizing the resulting suspension by heating; and subsequently washing and drying the product.

2. A process in accordance with claim 1 wherein a mixture of monomers is selected.

3. A process in accordance with claim 2 wherein the mixture contains from 2 monomers to about 20 monomers.

4. A process in accordance with claim 1 wherein the polymerized product obtained is subjected to washing and drying.

5. A process in accordance with claim 1 wherein the bulk and the suspension polymerization are accomplished by heating.

6. A process in accordance with claim 5 wherein heating is accomplished at a temperature of from about 30° C. to about 200° C.

7. A process in accordance with claim 5 wherein heating is accomplished at a temperature of from about 45° C. to about 120° C.

8. A process in accordance with claim 1 wherein the number and weight average molecular weight of the bulk polymerization product is between about 10,000 to about 1,000,000.

9. A process in accordance with claim 1 wherein the mixing of the conductive fillers in the partially polymerized monomer or comonomers is achieved with a high shear mixer.

10. A process in accordance with claim 1 wherein the dispersion of the partially polymerized monomer mixed with conductive filler in water containing the stabilizing component is accomplished with a high shear mixer.

11. A process in accordance with claim 1 wherein the ratio of crosslinked polymer/linear polymer in the final product is from about 0.001 to about 0.05.

12. A process in accordance with claim 1 wherein the conductive polymeric particles obtained have an average particle diameter of from about 0.05 micron to about 1 micron.

13. A process in accordance with claim 2 wherein the ratio of conductive filler to the polymer in the final product is from about 0.01 to about 1.

14. A process in accordance with claim 1 wherein the conductive filler is distributed throughout the polymer matrix of the final product.

15. A process in accordance with claim 1 wherein the conductivity of the final conductive polymer product is from about $10^{-10}$ to about $10^{-4}$ $(ohm-cm)^{-1}$.

16. A process in accordance with claim 1 wherein the number and weight average molecular weight of the linear portion of the polymer in the product polymer is between about 5,000 to about 500,000.

17. A process in accordance with claim 1 wherein the triboelectrical charge of the polymer product is from about +40 to about −40 microcoulombs per gram.

18. A process in accordance with claim 1 wherein the monomer is selected from the group consisting of α-methyl-styrene, p-chlorostyrene, monocarboxylic acids and the derivatives thereof; dicarboxylic acids with a double bond and their derivatives; vinyl ketones; vinyl naphthalene; unsaturated mono-olefins; vinylidene halides; N-vinyl compounds; fluorinated vinyl compounds and mixtures thereof.

19. A process in accordance with claim 1 wherein the monomer is selected from the group consisting of acrylic acid, methyl acrylate, ethyl acrylate, butyl acrylate, dodecyl acrylate, octyl acrylate, phenyl acrylate, methacrylic acids, methyl methacrylate, ethyl methacrylate, butyl methacrylate, octyl methacrylate, acrylonitrile and acrylamide; maleic acid, monobutyl maleate, dibutyl maleate; vinyl chloride, vinyl acetate and vinyl benzoate; vinylidene chloride; pentafluoro styrene allyl pentafluorobenzene and N-vinyl pyrrole.

20. A process in accordance with claim 1 wherein the filler is selected from the group consisting of conductive carbon blacks, metal oxides, metals, and mixtures thereof.

21. A process in accordance with claim 1 wherein the polymerization initiator is selected from the group consisting of azo compounds and peroxides.

22. A process in accordance with claim 22 wherein the polymerization initiator is benzoyl peroxide, lauryl peroxide, 1-1-(t-butylperoxy)-3,3,5-trimethylcyclohexane, n-butyl-4,4-di-(t-butylperoxy)valerate, dicumyl peroxide, 2,2′azodimethylvaleronitrile, 2,2′azoisobutyronitrile, azobiscyclohexanenitrile, or 2-methylbutronitrile.

23. A process in accordance with claim 1 wherein the stabilizing component is selected from the group consisting of methyl cellulose, ethyl cellulose, hydroxypropyl cellulose, the sodium salt of carboxyl methyl cellulose, polyacrylate acids, polyvinyl alcohol, gelatins, starches, gums, alginates, zein and casein.

24. A process in accordance with claim 1 wherein the stabilizing component is tricalcium phosphate, talc or barium sulfate.

25. A process in accordance with claim 1 wherein the crosslinking component is selected from the group consisting of compounds having two or more polymerizable double bonds.

26. A process in accordance with claim 1 wherein the crosslinking component is divinylbenzene, divinylnaphthalene, ethylene glycol diacrylate, or divinylether.

27. A process in accordance with claim 1 wherein the chain transfer component is selected from the group consisting of mercaptans and halogenated hydrocarbons.

28. A process in accordance with claim 27 wherein the chain transfer component is carbon tetrachloride, butylmercaptan, or laurylmercaptan.

29. A process in accordance with claim 1 wherein the polymeric product is polymethylmethacrylate with a conductivity of $10^{-10} (ohm-cm)^{-1}$ and with an average particle size of about 0.4 micron, and the filler is comprised of an acetylene carbon black.

30. A process for the preparation of conductive submicron polymeric particles consisting of mixing two monomers with a polymerization initiator, a crosslinking component and a chain transfer component; effecting bulk polymerization until from about 10 to about 50 weight percent of the monomer has been polymerized; terminating polymerization by cooling the partially polymerized monomer; adding thereto from about 1 to about 50 weight percent of a conductive filler, or conductive fillers, followed by mixing thereof; dispersing the aforementioned mixture of conductive filler or fillers, and partially polymerized product in water containing a stabilizing component selected from the group consisting of nonionic and ionic water soluble polymeric stabilizers to obtain a suspension of particles with an average diameter of from about 0.05 to about 1 micron in water; polymerizing the resulting suspension by heating; and subsequently washing and drying the product.

31. A process in accordance with claim 30 wherein the monomer is selected from the group consisting of α-methyl-styrene, p-chlorostyrene, monocarboxylic acids and the derivatives thereof; dicarboxylic acids with a double bond and their derivatives; vinyl ketones; vinyl naphthalene; unsaturated mono-olefins; vinylidene halides; N-vinyl compounds; fluorinated vinyl compounds and mixtures thereof.

* * * * *